United States Patent [19]
Argentieri

[11] 3,747,409
[45] July 24, 1973

[54] ALTIMETER BARO-SETTING MECHANISM
[75] Inventor: Michael A. Argentieri, West Orange, N.J.
[73] Assignee: Intercontinental Dynamics Corporation, Engelwood, N.J.
[22] Filed: Dec. 7, 1971
[21] Appl. No.: 205,577

[52] U.S. Cl. .................................................. 73/387
[51] Int. Cl. .............................................. G01l 7/12
[58] Field of Search ....................... 73/384, 387, 386

[56] References Cited
UNITED STATES PATENTS
2,398,055  4/1946  Springer................................. 73/387
3,353,408  11/1967  Daleo...................................... 73/387
FOREIGN PATENTS OR APPLICATIONS
732,445  2/1943  Germany ............................... 73/387

Primary Examiner—Donald O. Woodiel
Attorney—Ostrolenk, Faber, Gerb & Soffen

[57] ABSTRACT

In barometric setting mechanisms for aircraft altimeters providing visually readable outputs, an elongated, non-linear scale calibrated in inches of mercury and/or millibars printed upon a scroll-type preformed tape movable by a driving sprocket, the non-linear gradations provided serving to represent the relationship between pressure altitude and the barometric setting number of a specified range. The indicia provided on the tape are visually observable through a window provided in the altimeter meter dial face.

10 Claims, 7 Drawing Figures

PATENTED JUL 24 1973 3,747,409
SHEET 1 OF 2
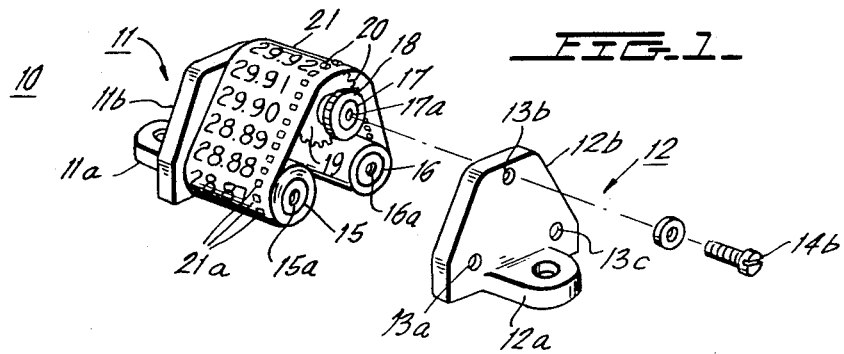
FIG. 1
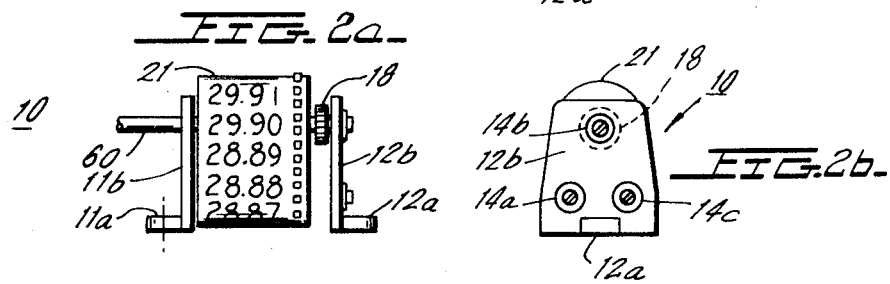
FIG. 2a
FIG. 2b
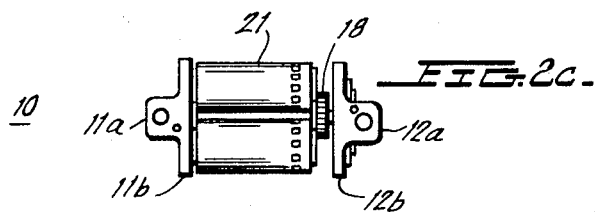
FIG. 2c
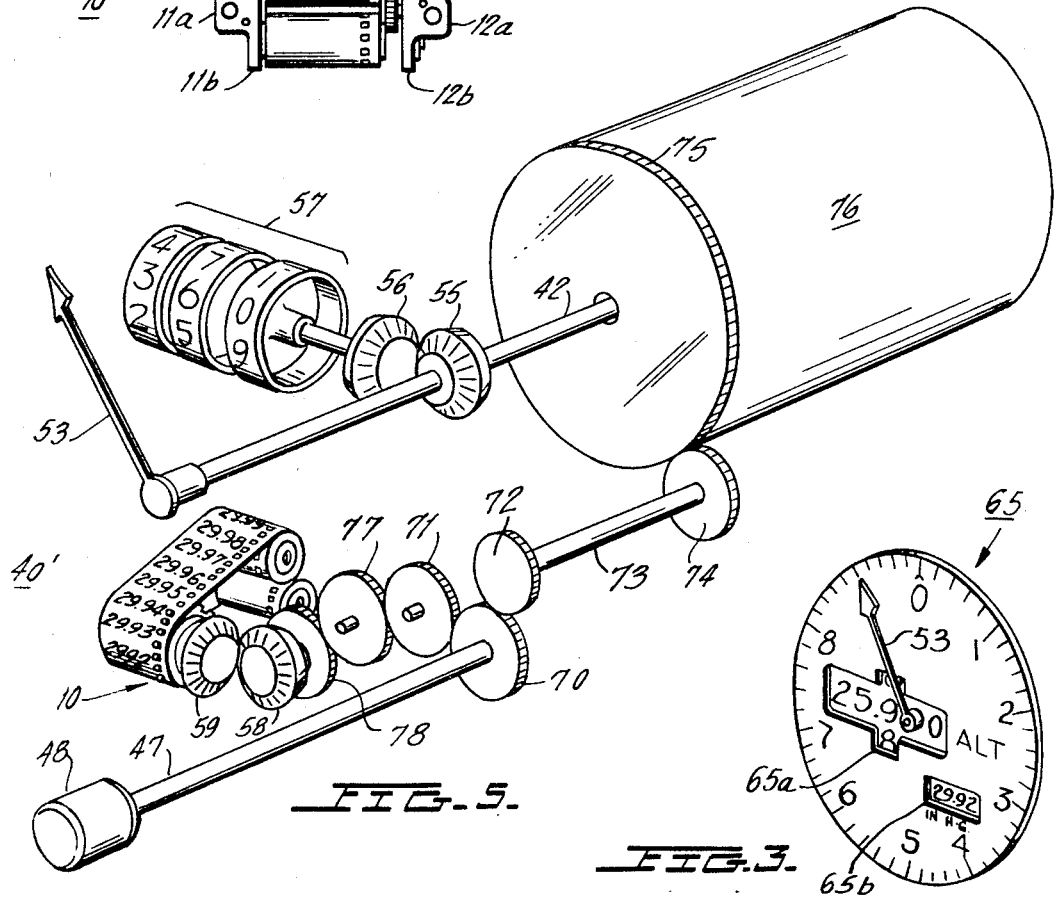
FIG. 5
FIG. 3

3,747,409

ALTIMETER BARO-SETTING MECHANISM

The present invention relates to altimeters of the type employed in aircraft and more particularly to a novel tape means for providing visually observable readings representing barometric settings, which readings are printed upon the tape in a non-linear fashion to represent the nonlinear relationship between pressure altitude and the barometric setting of a specified range.

BACKGROUND OF THE INVENTION

Altimeters typically provide an altitude reading (in the units of feet) and a barometric setting. The altitude reading is provided by a diaphragm responsive to atmospheric pressure. The response of the diaphragm is converted by suitable linkage into a dial face reading. Altitude readings normally require adjustment in accordance with local barometric conditions. The barometric setting adjustment is obtained by moving the desired barometric reading into view on a dial face through a manually settable knob coupled to a single turn indicia - bearing disc which is rotatable behind a window in the meter dial face. The indicia provided on the single turn disc are spaced along the periphery of the disc in a non-linear fashion. The reading is viewed through a window provided in the dial face, which window subtends a small segment of the disc and is usually provided with a fixed lubber line (i.e., centering line) for accurate setting. The limitation of this design is the practical scale length. A typical single turn disc is provided with closely spaced indicia, which spacing is determined by the circumference of the disc which is usually of the order of 7 inches. The selection of the diameter of the disc is a compromise between the amount of indicia required to be placed upon the disc and the limited amount of space which the device is permitted to occupy.

Another type of prior art altimeter employs a four digit, multi-drum counter mechanism for displaying the barometric scale. The counter mechanism is mounted behind the aforementioned dial face window provided in the meter dial face. While this design provides good readability, the counter mechanism requires the use of a non-linear mechanism to introduce the functional relationship between altitude and barometric setting number. This mechanism significantly increases the complexity, reliability, size and cost of the altimeter. In addition, it often has the effect of increasing altimeter errors due to the need of gearing down to a less than one turn function generator (i.e., a cam, eccentric gear, or other device) and then to gear back up again to the altimeter's pointer or other display. The errors introduced in each of the gear linkages are cumulative and hence affect the over-all accuracy of the device.

BRIEF DESCRIPTION OF THE INVENTION

The present invention is characterized by providing a barometric setting mechanism for displaying nonlinearly disposed readings through the use of a scroll-type spring mechanism which is capable of providing an extremely large number of discrete readings while at the same time occupying a small amount of space and avoiding the need for the complex gearing mechanism referred to hereinabove.

The barometric setting mechanism of the present invention apprises a rather long, non-linear scale calibrated in inches of mercury or millibars (or both) printed upon the surface of a thin, springy metal tape having perforations along one edge thereof for engagement with a driving sprocket. The function of the non-linearity represents the relationship between pressure altitude and the barometric setting number of a specified range. The spring tape is entrained about a portion of a cylindrical drum which is driven by the baro-setting knob. The drum is provided with sprocket teeth for engaging the perforations of the tape to drive the tape and keep it in definite and fixed registration with the teeth of the drum. The springy, metallic tape is preformed so that its natural shape is in the form of a tight spiral which is designed to be self-coiling. A tape having an unwound length of the order of 70 inches has been found to provide a ten to one increase in scale spacing between readings permitting a number to be printed for each 0.01 inch of mercury while at the same time occupying a relatively limited space, thereby overcoming the need for complex gearing required in barometric setting mechanisms of the multi-drum type while at the same time providing vastly increased spacing capabilities as compared with the spacing requirements of barometric setting mechanisms of the one-turn disc type.

OBJECTS OF THE INVENTION

It is therefore one object of the present invention to provide a novel non-linear barometric setting mechanism employing an elongated tape.

Another object of the present invention is to provide a novel barometric setting device for use in altimeters and the like which employs a novel elongated tape formed of a springy, metallic pre-coiled tape to form a self-winding, scroll-type configuration.

BRIEF DESCRIPTION OF THE FIGURES

The above, as well as other objects of the present invention, will become apparent when reading the accompanying description and drawing in which:

FIG. 1 is an exploded perspective view of the barometric setting tape counter of the present invention.

FIGS. 2a, 2b and 2c are side, end and bottom views respectively of the assembly of FIG. 1.

FIG. 3 shows a typical altitude display dial.

FIGS. 4 and 5 show the mechanical linkages and driving mechanisms used for operating the altitude display and barometric setting devices to provide the readings as shown in the display of FIG. 3.

DETAILED DESCRIPTION OF THE FIGURES

Figure 4:
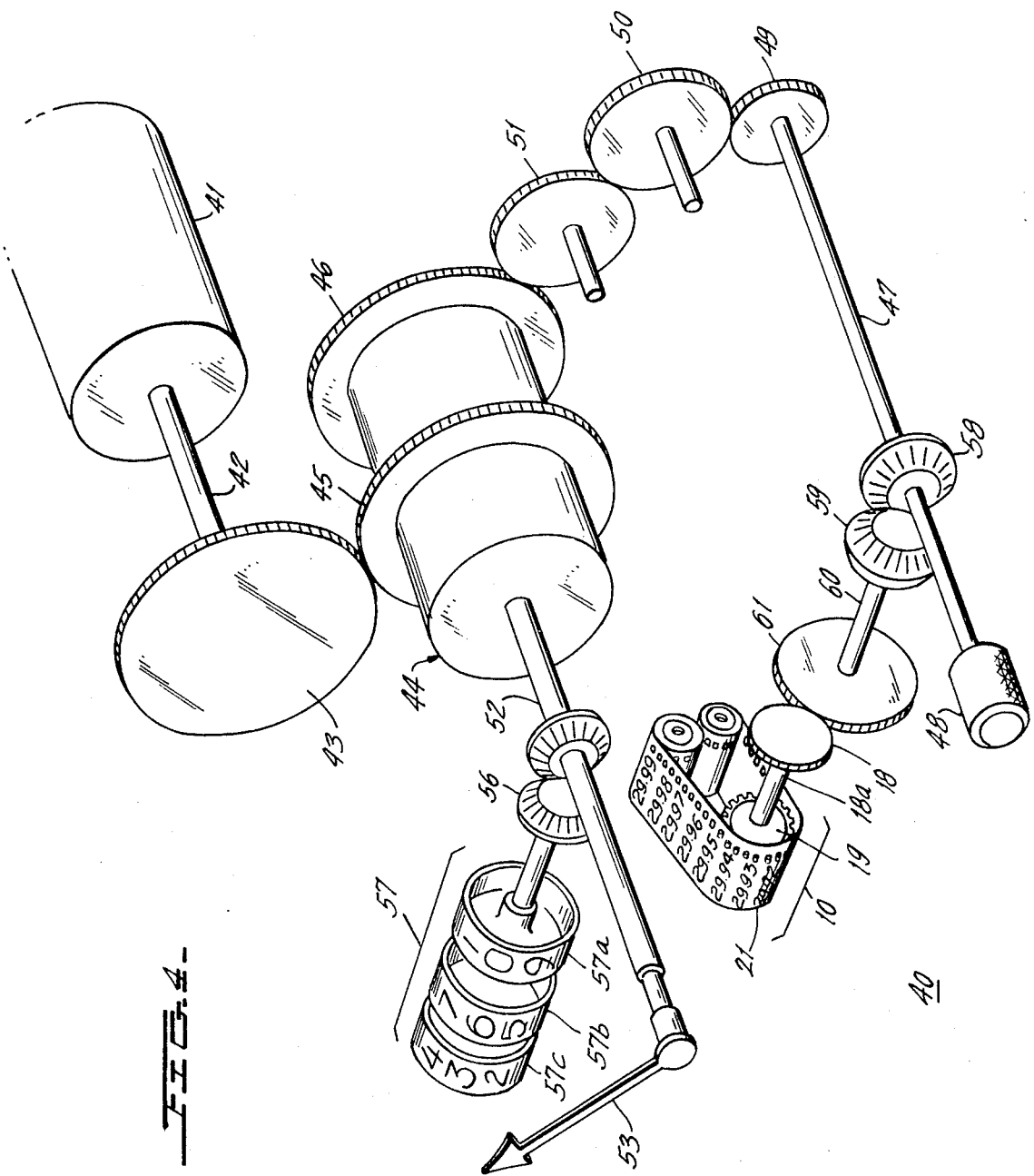

FIGS. 1, 2, 4 and 5 and more specifically FIGS. 1 and 2a–2c show the baro-setting assembly 10 designed in accordance with the principles of the present invention. The baro-setting assembly 10 is comprised of a pair of mounting plates 11 and 12, each having a base portion 11a and 12a, respectively, provided with an aperture for securing the assembly upon a frame or other suitable support. The mounting plates are further comprised of upright portions 11b and 12b, respectively. Upright 12b is provided with a plurality of openings 13a, 13b and 13c, each adapted to receive an associated fastening means 14a, 14b and 14c, respectively. Fastening means 14a and 14c each threadedly engage an associated tapped aperture 15a and 16a provided within a pair of shafts 15 and 16, respectively. Fastening means 14b is adapted to threadedly engage a tapped aperture 17a provided in a bearing 17 upon which a gear 18 is mounted in a freewheeling manner. A drum 19, having sprocket teeth 20 at one end thereof, is also freewheelingly mounted upon fastening means 14b, but is mechanically locked with gear 18 so as to rotate therewith.

The negator spring 21 is an elongated tape member made of a suitable self-coiling springy metallic material preformed so that its natural shape is in the form of a tight spiral of an outside diameter preferably but not necessarily limited to a diameter which is smaller than that of the drum 19 having sprocket teeth 20. Both ends of the negator spring are wound about storage drums 15 and 16.

The outer surface of the negator spring 21 has provided thereon, either by a suitable printing operation or by any other technique, a plurality of indicia viewable through the dial face in a manner to be more fully described. The indicia represent the range of barometric readings which is typically from 31.0 to 28.1 inches of mercury, but may at the user's option be arranged to cover a larger range such as 31.0 to 22.0 inches of mercury with each reading differing from its adjacent reading by a difference of 0.01 inches of mercury.

A drive shaft (to be more fully described) meshes with gear 18 so as to rotate gear 18 and simultaneously therewith drum 19 with the setting of the barometric setting counter being controlled by a baro-setting knob, to be more fully described. Drum 19 has one edge thereof provided with sprocket teeth 20 which engage perforations 21a provided along one edge of the tape to drive the tape and keep it in definite registration with the teeth on the drum. The spring is fed on to drum 19 from either of two fixed smooth cylindrical shafts 15 or 16 which have diameters smaller than the diameter of the free spring shape. The spring will coil itself, after leaving one of the drums upon one of the remaining drums. The indicia on the tape are viewed, preferably but not necessarily, as they pass over the top-most section of the drum in the region at which the teeth engage the tape. If desired, the storage drum 15 and 16 may be mounted to rotate in a freewheeling manner.

FIGS. 4 and 5 show typical altimeter systems which may use the baro-setting tape counter of FIGS. 1–2c. The system 40 of FIG. 4 is comprised of a servo type pressure altitude mechanism 41 for accepting signals from an aneroid diaphragm mechanism (not shown for purposes of simplicity) or from any other suitable device which provides an electrical signal for driving servo 41 by an amount which is a linear function of pressure altitude. The output shaft 42 of servo 41 drives a gear 43 which meshes with one input gear 45 of a mechanical differential mechanism 44. The other input gear 46 of mechanical differential 44 is driven by a shaft 47 having the baro-setting manual control knob 48 fixedly secured to the forward end thereof. The rearward end of shaft 47 is provided with a gear 49 which meshes with intermediate gears 50 and 51 to enable shaft 47 to drive gear 46 through the appropriate gear ratio. The output shaft 52 of mechanical differential 44 has a pointer arm 53 secured at the forward end thereto.

A bevel gear 55 is secured to shaft 52 at a point spaced inwardly from pointer 53 so as to mesh with a bevel gear 56 for driving altitude display counter 57.

Shaft 47 is provided with a bevel gear 58 mounted intermediate the ends of shaft 47 so as to mesh with a bevel gear 59. Bevel gear 59 drives a shaft 60 to rotate gear 61 which meshes with gear 18 of the altitude baro-setting tape counter 10. If desired, and if the appropriate gear ratio is otherwise obtainable, shaft 60 may be directly mechanically coupled to drum 20 in the manner shown in FIG. 2a to eliminate the need for gears 61 and 18.

FIG. 3 shows the dial face 65 which cooperates with the mechanism of FIG. 4 (or the mechanism of FIG. 5) to display the altitude and baro-setting readings. The marginal portion of the front face of dial 65 is provided with graduations which cooperate with pointer 53 to provide an altitude reading in hundreds of feet. A central portion of dial face 65 is provided with a substantially T-shaped slot 65a behind which the altitude display counter 57 is positioned. Counter 57 is provided with three count wheels having decimal indicia (i.e., indicia from decimal 0 through decimal 9) to provide any reading from 00.0 thousand feet to 99.9 thousand feet. Since the reading between any two adjacent indicia on the hundreds of feet counter wheel 57a is difficult to estimate when viewed through T-shaped window 65a, pointer 53, cooperating with graduations around the periphery of dial face 65, serves to provide a more accurate indication of the hundreds of feet of a reading at any given instant. For example, with the position of the counter being as shown in FIGS. 3, 4 and 5, it can be seen that the reading is 25,900 feet. With the graduations provided by the graduations on the dial face and cooperating pointer 53, it is possible to ascertain a reading in tens of feet.

The baro-setting indicating means is driven by manual knob 58 which drives one gear 46 of differential 44 while the other gear 45 is driven by the servo operated shaft 42 of servo 41 which rotates at the linear function of pressure altitude. The further output shaft 52 of the differential operates the pilot's display of barometrically corrected pressure altitude. It should be understood that this display can be a pointer, a digital counter, a tape similar to that described for the barometric-setting scale, a combination thereof or any other type of display. The output shaft 52 of differential 44 can alternatively, or in addition thereto, drive a synchro, encoder, potentiometer, or other element as a linear function of corrected pressure altitude. The barometric-setting counter is adjusted by rotating manually operable knob 48 which, in turn, rotates drum 19 through gear train 58–59, shaft 60, gear train 61–19 and shaft 18a (in the embodiment shown in FIG. 4).

It should be understood that the indicia provided on the face of the negator spring 21 are positioned upon the face of the negator spring in a non-linear fashion. The non-linear scale, which is calibrated in inches of mercury or millibars (or both) and spaced in a non-linear fashion, represents the non-linear relationship between pressure altitude and the barometric setting number of a specified range.

FIG. 5 shows another arrangement 40' of an altimeter structure in which like elements as between FIGS. 4 and 5 have been designated by like numerals. Manually operable control knob 48, in the embodiment of FIG. 5, is provided with an edge gear 70 which simultaneously meshes with gears 71 and 72. Gear 72 is secured to shaft 73 as is a gear 74 provided at the rearward end of shaft 73. This gear meshes with a gear 75 provided on diaphragm powered pressure altitude mechanism 76 which is mounted for rotation by any suitable means (not shown) to achieve a mechanical differential thereby. The output shaft 42 of device 76 controls pointer 53 and altitude display counter 57 through meshing bevel gears 55 and 56 in a manner similar to that shown in FIG. 4.

Gear 70 provided on shaft 47 meshes with intermediate gears 71, 77 and 78. Gear 78 is secured to a shaft upon which is mounted a bevel gear 58 which meshes with bevel gear 59 which is directly coupled to the shaft of altitude baro-setting tape counter 10. The baro-setting tape counter control knob 48, in both FIGS. 4 and 5, sets a particular barometric setting which is viewable through dial face 65 by positioning the negator spring immediately behind a rectangular shaped slot 65b provided in the dial face. This setting is automatically coupled into the altitude setting either by the differential mechanism 44 of FIG. 4 or by rotating the pressure altitude mechanism 76 so as to obtain a pressure corrected altimeter reading.

The setting of counter assembly 10 may be adjusted at any time simply by manipulation of the control knob 48.

The non-linearity of the barometric-settings provided on the tape is controlled simply by printing the settings with a non-linear spacing arrangement so as to maintain the functional relationship between altitude and the barometric setting number. The mechanism 10 employed in FIGS. 4 and 5 provides simplified setting while eliminating the complexity and reducing the errors which would otherwise occur in conventional devices. The device of the present invention provides excellent readability and totally eliminates the need for a non-linear mechanism or device to maintain the non-linear functional relationship between altitude and barometric setting.

Since the negator spring tape is tightly wound it has been found that tapes of the order of 70 inches long may be utilized in a relatively small space to thereby provide a 10 to 1 increase in scale spacing over conventional devices enabling a setting number to be printed on the tape for each 0.01 inch of mercury.

It can be seen that the present invention provides a novel negator spring assembly which is advantageous for use as an altitude baro-set tape counter having improved readability, accuracy and simplicity as well as reduced cost as compared with conventional devices.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A barometric setting device for use in displaying a barometric setting, and introducing the appropriate barometric setting into the altitude reading comprising:
   first and second storage drums arranged in spaced parallel fashion;
   a third drum;
   means for rotatably mounting said third drum to rotate about its longitudinal axis;
   said longitudinal axis being arranged in spaced parallel fashion with the axes of said first and second storage drums;
   said third drum having an annular array of driving sprocket teeth surrounding one track of said drum;
   an elongated negator tape of a springy metallic material being prewound to form first and second tightly wound coils at its free ends and which remain coiled when not influenced by external forces;
   indicia representing barometric readings being arranged on one surface of said tape with said indicia being spaced in a non-linear manner;
   said tape having a plurality of openings arranged in spaced fashion near one edge of said tape;
   said first and second coiled ends being respectively wound about said first and second storage drums;
   the non-indicia bearing surface of said tape engaging said third drum whereby said openings are in registration with and are adapted to receiving selected ones of said sprocket teeth;
   means for rotating said third drum in either a first or second direction to uncoil said tape from one of said storage drums while the tape fed toward the other of said storage drums tightly coils itself about said other storage drum.

2. The assembly of claim 1 wherein the axis of said third drum lies a spaced distance from an imaginary line joining the axes of said first and second storage drums.

3. The assembly of claim 1 wherein said first and second storage drums include means for rotatably mounting their associated drums in a free-wheeling manner.

4. The assembly of claim 1 further comprising a dial face having a window;
   a portion of said tape being positioned behind said window to permit viewing of said indicia through said window.

5. The assembly of claim 4 wherein said rotating means further comprises a rotatable control knob; gear means coupled between said knob and said third drum for rotating said third drum when said knob is manually manipulated to position the desired barometric reading behind said window.

6. An altimeter capable of providing altitude readings which are adapted to be adjusted in accordance with local barometric conditions comprising:
   a pressure operated servo having output means adapted to rotate with changes in altitude;
   an altitude display means coupled to said output means for displaying an altitude reading controlled by said servo;
   a barometric setting device of the type described in claim 1 for providing a means for adjusting the altitude reading in accordance with local barometric conditions;
   means coupled between said rotating means and said servo for altering the altitude reading in accordance with the barometric reading of said barometric setting device;
   said altitude display means including a window; said barometric setting device being positioned behind said window to permit a barometric reading to be viewed therethrough.

7. The assembly of claim 6 wherein said rotating means further comprises a rotatable control knob; first gear means coupled between said knob and said third drum for rotating said third drum when said knob is manually manipulated to position the desired barometric reading behind said window.

8. The device of claim 7 further comprising second gear means for coupling said barometric setting adjustment to said servo.

9. The device of claim 8 wherein said servo is rotatably mounted; third gear means provided on said servo for engagement with said second gear means to provide for said barometric adjustment.

10. The device of claim 8 whrein said servo output means further comprises a mechanical differential means having first and second input shafts and an output shaft, said output shaft being coupled to the input of said display means;

said first input shaft being coupled to the output of said servo;

said second input shaft including third gear means being coupled to said second gear means for altering the altitude reading in accordance with the particular barometric value selected by said control knob.

* * * * *